United States Patent
Chen et al.

(10) Patent No.: US 12,546,010 B2
(45) Date of Patent: *Feb. 10, 2026

(54) TURBINE ENGINE SHAFT COATING

(71) Applicant: RTX Corporation, Farmington, CT (US)

(72) Inventors: Lei Chen, South Windsor, CT (US); Poulomi Sannigrahi, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/089,081

(22) Filed: Dec. 27, 2022

(65) Prior Publication Data

US 2023/0139403 A1 May 4, 2023

Related U.S. Application Data

(62) Division of application No. 17/021,304, filed on Sep. 15, 2020, now Pat. No. 11,572,626.

(60) Provisional application No. 62/903,144, filed on Sep. 20, 2019.

(51) Int. Cl.
| | |
|---|---|
| *C23C 22/00* | (2006.01) |
| *B32B 15/01* | (2006.01) |
| *C22C 21/10* | (2006.01) |
| *C23C 24/00* | (2006.01) |
| *C23C 24/08* | (2006.01) |

(52) U.S. Cl.
CPC ............ *C23C 24/00* (2013.01); *B32B 15/012* (2013.01); *C22C 21/10* (2013.01); *C23C 24/08* (2013.01)

(58) Field of Classification Search
CPC ..................................................... C23C 22/00
See application file for complete search history.

(56) References Cited

U.S. PATENT DOCUMENTS

| | | |
|---|---|---|
| 3,248,251 A | 4/1966 | Allen |
| 4,141,725 A | 2/1979 | Murai et al. |
| 4,740,355 A | 4/1988 | Linder et al. |
| 4,906,524 A | 3/1990 | Takao |
| 9,739,169 B2 | 8/2017 | Klotz et al. |
| 2006/0166014 A1 | 7/2006 | Klotz et al. |
| 2007/0116980 A1* | 5/2007 | Schmitz ............... C23C 28/345 428/681 |

(Continued)

FOREIGN PATENT DOCUMENTS

| | | |
|---|---|---|
| EP | 2730679 A1 | 5/2014 |
| KR | 101264575 B1 | 5/2013 |

OTHER PUBLICATIONS

European Office Action dated Feb. 6, 2024 for European Patent Application No. 20196691.8.

(Continued)

*Primary Examiner* — Gordon Baldwin
*Assistant Examiner* — Mohammad Mayy
(74) *Attorney, Agent, or Firm* — Bachman & LaPointe, P.C.

(57) ABSTRACT

A coated steel substrate has a steel substrate having a surface. A coating layer is atop the surface. The coating layer includes: aluminum activated by indium; and a ceramic binder. The coating also may comprise of multiple layers with different properties to facilitate the galvanic protection capability.

19 Claims, 2 Drawing Sheets

(56) References Cited

U.S. PATENT DOCUMENTS

| | | | |
|---|---|---|---|
| 2007/0224359 A1 | 9/2007 | Burin et al. | |
| 2012/0187343 A1* | 7/2012 | Matzdorf | C09D 5/103 |
| | | | 252/389.52 |
| 2015/0090154 A1 | 4/2015 | Belov et al. | |
| 2015/0184303 A1* | 7/2015 | Belov | C23C 30/00 |
| | | | 427/372.2 |
| 2019/0078179 A1 | 3/2019 | Matzdorf et al. | |

OTHER PUBLICATIONS

C. B. Breslin, L. P. Friery, and W. M. Carroll, "Influence of Impurity Elements on Electrochemical Activity of Aluminum Activated by Indium", Corrosion, Nov. 1993, pp. 895-902, vol. 49(11), NACE International, Houston, Texas.

"Common Requirements Cathodic Protection", NOROSK Standard, Rev. Dec. 1, 1994, NORSOK Lysaker, Norway.

Cleophas Loto & Patricia Popoola, "Effect of anode and size variations on the cathodic protection of mild steel in sea water and sulphuric acid", International Journal of the Physical Sciences, Jun. 18, 2011, pp. 2861-2868, vol. 6(12), Academic Journals, Lagos, Nigeria.

Kevin Klotz et al., "Eliminating Carcinogens in Compressor Coatings", Proceedings of ASME Turbo Expo 2013: Turbine Technical Conference and Expedition, Jun. 2013, American Society of Mechanical Engineers, New York, NY.

"Aluminum and Zinc Anodes", Technical Datasheet, May 12, 2005, BAC Corrosion Control, Ltd, Telford, Shropshire, England.

"Al-Zn-In Metal Spraying", brochure, Jan. 25, 2013, BAC Corrosion Control Ltd., Telford, Shropshire, England.

Search Report dated Nov. 5, 2020 for European Patent Application No. 20196691.8.

Office Action dated Apr. 29, 2022 for U.S. Appl. No. 17/021,304.

\* cited by examiner

TURBINE ENGINE SHAFT COATING

CROSS-REFERENCE TO RELATED APPLICATIONS

This is a divisional of U.S. patent application Ser. No. 17/021,304, filed Sep. 15, 2020, and entitled "Turbine Engine Shaft Coating" which claims benefit of U.S. Patent Application No. 62/903,144, filed Sep. 20, 2019, and entitled "Turbine Engine Shaft Coating", the disclosures of which are incorporated by reference herein in their entireties as if set forth at length.

BACKGROUND

The disclosure relates to gas turbine engines. More particularly, the disclosure relates to coated steel shafts in gas turbine engines.

Gas turbine engines (used in propulsion and power applications and broadly inclusive of turbojets, turboprops, turbofans, turboshafts, industrial gas turbines, and the like) use shafts in one or more locations to transmit rotation. In the high pressure turbine (HPT) section a two-spool (or greater) engine, the temperature may be so high as to require use of a nickel-based superalloy. In the low pressure turbine (LPT) section of a two-spool (or greater) engine, temperatures may be low enough to allow use of steel to reduce cost. Exemplary shaft material is a low-alloy, high strength, steel. The low alloy steels contain minor non-ferrous elements and have yield strengths greater than 275 MPa. Examples include AISI 4130, AISI 4340, AISI H-11 and the like.

High strength alloys are generally prone to atmospheric corrosion and require protective treatments such as coatings. However, elevated operating temperatures in an engine environment greatly limit the choices of corrosion protection coatings. Specifically, organic corrosion inhibitors would be compromised by thermal decomposition. Although inorganic corrosion inhibitors such as chromate have been found to be effective in retarding metal corrosion, chromate is a carcinogen and is being phased out in industries. In addition, due to the inability to form passivation layer, the high strength steel alloys rely upon sacrificial coatings to impart corrosion resistance.

For elevated temperature applications, an aluminum-ceramic coating is an attractive option. An exemplary coating is aluminum powder in alkali metal silicate (e.g., sodium silicate). See, U.S. Pat. No. 9,739,169, of Klotz, et al., Aug. 22, 2017, entitled "Formation of corrosion-resistant coating" (hereafter the '169 patent). Such coatings may be applied as aqueous slurries and may include additives such as wetting agents, organic solvents, and the like. The sacrificial Al-ceramic coatings are qualified mostly in accelerated salt fog tests such as ASTM B-117 wherein high concentration chloride promotes and accelerates corrosion. Such a corrosive environment is considered representative of only coastal applications at ambient temperatures.

SUMMARY

One aspect of the disclosure involves a coated steel substrate comprising: a steel substrate having a surface; and a coating layer atop the surface. The coating layer comprises: aluminum activated by indium; and a ceramic binder.

A further embodiment of any of the foregoing embodiments may additionally and/or alternatively include the coating layer comprising 5% to 40% porosity.

A further embodiment of any of the foregoing embodiments may additionally and/or alternatively include the coating layer comprising, by weight: 0.5% to 40% ceramic binder including up to 2% impurities and additives; and 60% to 97.5% aluminum alloy.

A further embodiment of any of the foregoing embodiments may additionally and/or alternatively include the aluminum alloy being at least 90% aluminum by weight.

A further embodiment of any of the foregoing embodiments may additionally and/or alternatively include the aluminum alloy being 0.01% to 3.0% indium by weight.

A further embodiment of any of the foregoing embodiments may additionally and/or alternatively include the coating layer comprising zinc.

A further embodiment of any of the foregoing embodiments may additionally and/or alternatively include the ceramic binder comprising an alkali metal silicate.

A further embodiment of any of the foregoing embodiments may additionally and/or alternatively include the aluminum activated by indium comprising an Al—In alloy.

A further embodiment of any of the foregoing embodiments may additionally and/or alternatively include the aluminum activated by indium comprising: aluminum or an aluminum alloy; and indium oxide.

A further embodiment of any of the foregoing embodiments may additionally and/or alternatively include an under-layer between the surface and the coating layer and comprising: a ceramic binder and aluminum alloy in a naturally passivated state relative to the aluminum alloy of the coating layer.

A further embodiment of any of the foregoing embodiments may additionally and/or alternatively include the under-layer having a lower indium content than the coating layer; and the under-layer and the coating layer being each at least 20 micrometers thick.

A further embodiment of any of the foregoing embodiments may additionally and/or alternatively include: the under-layer having porosity of 7% to 25%; the coating layer having porosity of 15% to 38%; and the coating layer being more porous than the under-layer.

A further embodiment of any of the foregoing embodiments may additionally and/or alternatively include a gas turbine engine (or other turbomachine) including the coated steel substrate as a shaft.

A further embodiment of any of the foregoing embodiments may additionally and/or alternatively include a method for manufacturing the coated steel substrate, the method comprising: applying the aluminum and one or more precursors of the ceramic binder in one or more slurries; and heating to vaporize a carrier of the one or more slurries.

A further embodiment of any of the foregoing embodiments may additionally and/or alternatively include the aluminum being as at least one of an Al—In or an Al—Zn—In.

A further embodiment of any of the foregoing embodiments may additionally and/or alternatively include the one or more precursors comprising glass formers comprising one or more of $Na_2O$, $K_2O$, and silica.

A further embodiment of any of the foregoing embodiments may additionally and/or alternatively include the one or more slurries comprising indium oxide.

Another aspect of the disclosure is a coated steel substrate comprising a steel substrate having a surface. A coating is atop the surface. The coating comprises: a first layer comprising aluminum and a ceramic binder; and a second layer comprising a ceramic binder and at least 78% by weight aluminum activated by indium, the first layer between the substrate and the second layer.

A further embodiment of any of the foregoing embodiments may additionally and/or alternatively include the ceramic binder in the first ceramic coating layer and the ceramic binder in the second ceramic coating layer each comprising an alkali metal silicate.

A further embodiment of any of the foregoing embodiments may additionally and/or alternatively include: the first layer having a lower indium content than the second layer; and the first layer and the second layer being each at least 10 micrometers thick.

A further embodiment of any of the foregoing embodiments may additionally and/or alternatively include: the aluminum of the first layer being in a naturally passivated state and less active than the aluminum of the second layer.

A further embodiment of any of the foregoing embodiments may additionally and/or alternatively include the coated steel substrate being a turbomachine shaft.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

The sacrificial properties of the conventional aluminum-ceramic coating appear to be largely defeated in atmosphere containing aggressive air pollutants such as sulfur dioxide and particulate matter. One possible cause of this failure is the partial passivation of the aluminum powder in the presence of sulfuric acid or related sulfates. See, LOTO, CLEOPHAS & POPOOLA, PATRICIA, "Effect of anode and size variations on the cathodic protection of mild steel in sea water and sulphuric acid", International Journal of the Physical Sciences, Jun. 18, 2011, pp. 2861-2868, Vol. 6(12), Academic Journals, Lagos, Nigeria. In addition, solid particles and deposits can physically hamper the mass transport critical to enable the underlying galvanic protection mechanisms.

Figure 1A:
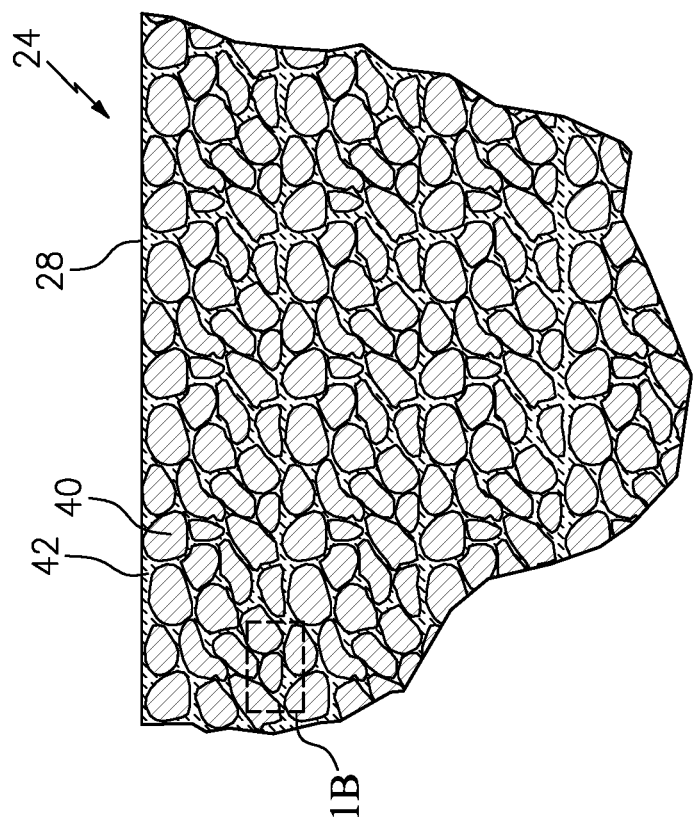
FIG. 1A is an enlarged view of the coating of FIG. 1.
Figure 1:
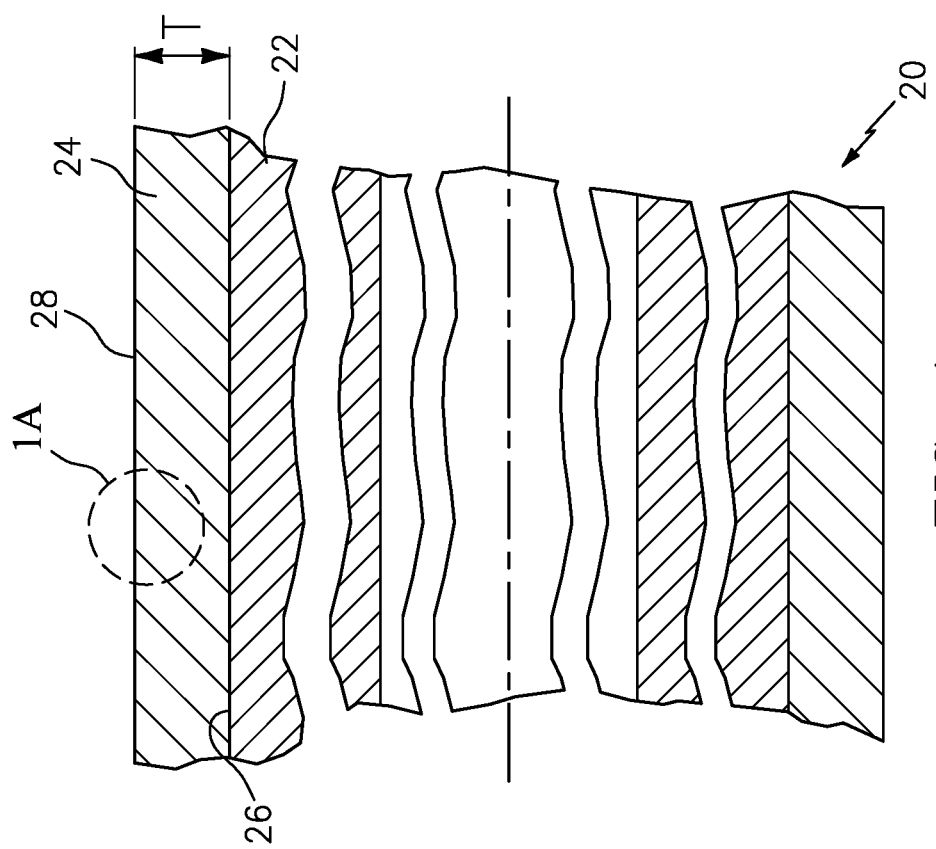
FIG. 1 is a schematic cross-sectional view of a coated substrate with a first coating system.

To improve protection relative to the use of aluminum powder of the '169 patent, alternative alloys may include zinc and/or indium. Exemplary alloys are Al—In, Al—Zn, and Al—Zn—In. As with the '169 patent, the coating is made with a slurry containing the alloy powder and ceramic precursors and heat treated to form a ceramic binding network. Accordingly, FIG. 1 shows an article 20 having a metallic substrate 22. As discussed above, exemplary substrates are steel and form shafts of a gas turbine engines or other turbomachines. The article has a coating system (coating) 24 atop a surface 26 of the substrate. The coating 24 itself has a surface (outer surface) 28. The exemplary coating 24 is a corrosion protection coating for protecting the substrate 22 from corrosion. Exemplary coating thickness T is 10 micrometers to 100 micrometers, more particularly 25 micrometers to 75 micrometers.

Figure 1B:
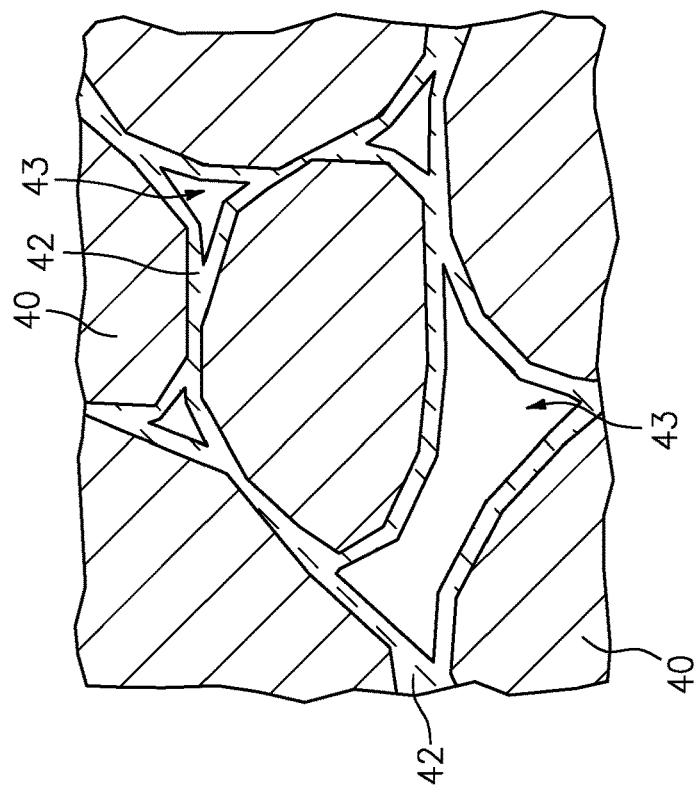
FIG. 1B is a further enlarged view of a portion of the coating of FIG. 1A.

As is discussed further below, the coating 24 comprises the activated aluminum alloy 40 (FIG. 1A) in particle form and a ceramic binder 42 forming an interconnected matrix holding the aluminum particles. Interconnected porosity 43 (FIG. 1B) allows air to permeate through the coating to reach the substrate. This is effectively a pre-use condition after the coating has been cured (chemically cured and/or solvent evaporation) but before any in use reaction with environmental sources (e.g., air, pollutants, combustion products, and the like) or with the substrate.

In some embodiments, the structure may be essentially a gas diffusion electrode where the solid electrode (Al alloy particles 40) is wrapped by the binder 42 and the space (porosity 43) created by the alloy-binder particle agglomerates serve as gas passages. The gas passages are essentially connected voids or air pockets. These pores may be sufficient in volume so that the electrode cannot be fully flooded, which would otherwise impede oxygen transport to the substrate.

A key activator is indium. Indium, either in alloyed form or free ions in electrolytes, has been shown to activate aluminum that otherwise would be passivated, particularly in a sulfuric acid environment. See, C. B. BRESLIN, L. P. FRIERY, AND W. M. CARROLL, "Influence of Impurity Elements on Electrochemical Activity of Aluminum Activated by Indium", CORROSION, November, 1993, pp. 895-902, Vol. 49(11), NACE International, Houston, Texas.

The Al alloy powder or flakes used in the coating typically range from 1 micrometer to 20 micrometers. For example, a D50 size may be 1 micrometer to 20 micrometers, more particularly 2 micrometers to 10 micrometers or 3 micrometer to 8 micrometers. To allow high temperature operation, the Al alloy and any other main coating constituents are bonded by a ceramic binder. The precursors of the binders include typically a glass-former such as $SiO_2$ and/or a phosphate and an alkali element (e.g., in the form of oxides such as in the '169 patent (e.g., $Na_2O$, $K_2O$)). The two components' precursors are kept in separate slurries and mixed (e.g., with the Al alloy powder which, along with other additives, may be in its own slurry) prior to coating application. Stoichiometric amounts of the binder precursors may be selected to ensure there is no excess amount of non-conductive inclusions in the resulting coating.

Exemplary final (pre-use) coating composition has 5% to 40% porosity, more narrowly 7% to 38% or 15% to 32%. Exemplary final coating composition is, by weight, 60% to 97.5% the Al alloy (or at least 78% or a range of 85.0% to 96.0%), remainder essentially binder with minor optional additives and impurities. Exemplary impurities are no greater than 1% by weight, preferably less than 0.50%. Exemplary additives are no greater than 1% by weight, preferably less than 0.50%.

For the Al—In alloy, exemplary weight percent composition is 0.01% to 3.0% In, more narrowly 0.10% to 3.0%, 0.10% to 2.0%, or 0.40% to 1.5%. Al with intra-alloy impurities and alloyants, if any, is substantially the balance (e.g., 97% to 99.99%). Such exemplary impurities and/or alloyants within the alloy may aggregate to up to an exemplary 10% by weight. This may leave the alloy with at least 90% Al or at least 95% or at least 97% or up to that 99.99% depending on purity. Exemplary individual element concentration of the impurities or alloyants may be up to 5% or up to 3% or up to 2%.

For the Al—Zn—In alloy, exemplary weight percent composition is: 0.01% to 0.20% In, more narrowly 0.02% to 0.10%; and 0.5% to 5.0% Zn, more narrowly 1.0% to 3.0%. Al with intra-alloy impurities and alloyants, if any (in amounts noted above) is substantially the balance (e.g., 94.9% to 99.48% or 95.0% to 99.5%).

For the Al—Zn alloy, exemplary weight percent composition is 0.5% to 5.0% Zn, more narrowly 1.0% to 4.0%, or 1.5% to 3.0%. Al with intra-alloy impurities and alloyants, if any (in amounts noted above) is substantially the balance (e.g., 94.5% to 99.5% or 96.0% to 99.0% or 97.0% to 99.0%).

More generically, for these and other variants/embodiments, the alloy may be at least 90% Al, more narrowly at least 95% or at least 97% or 90% to 99.9%, 95% to 99.9% or 97% to 99.9%.

Alternatively to use of such alloy, a compound soluble in an acidic environment over a range of temperatures can be added to the coating, which will be liberated to activate the Al powder. For example, this compound may contain indium (e.g., indium oxide). In an embodiment, this may involve adding a small amount of indium oxide to the slurry of the '169 patent. An exemplary amount is up to 8%, more particularly up to 5% or 0.5% to 8.0% or 1.5% to 5.0%.

Further embodiments include multiple layers of differing properties, including compositions and/or porosity. In one group of embodiments, the porosity increases progressively away from the substrate even if as-applied chemical composition is otherwise the same. This could also be a continuous gradation of porosity without discrete layers. An exemplary delta of porosity is 5.0% to 20.0% or 5.0% to 15.0%

Figure 2:
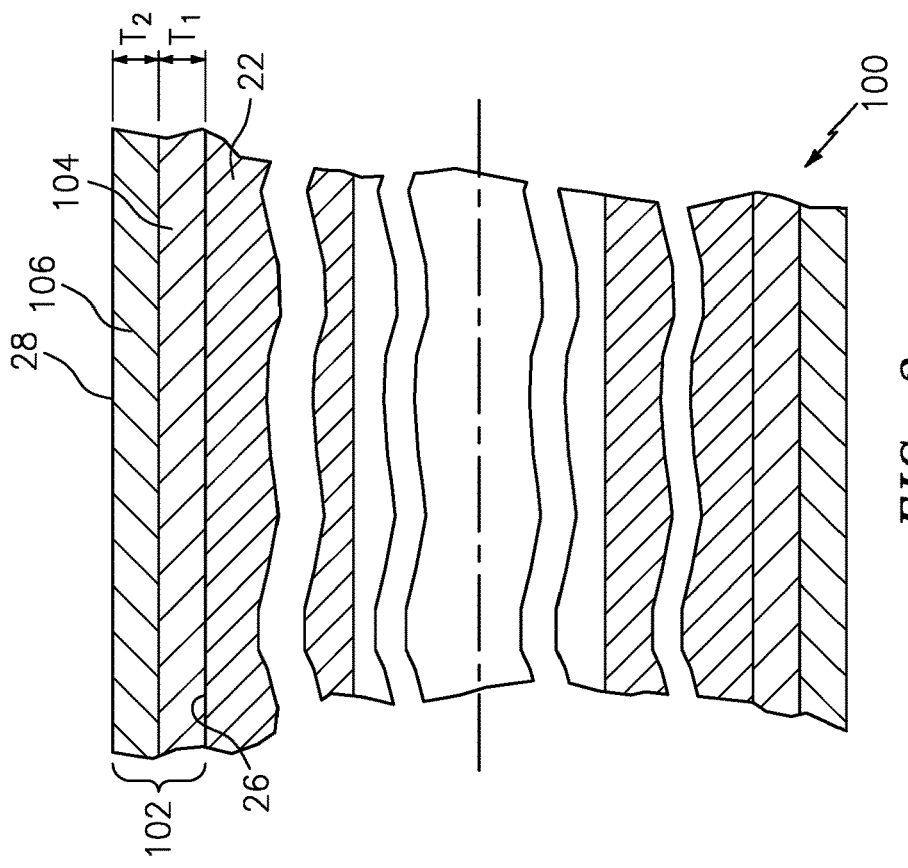
FIG. 2 is a schematic cross-sectional view of a coated substrate with a second coating system.

As an example of a chemical variation, FIG. 2 shows an article 100 with a two-layer (bi-layer) coating system 102 atop the substrate surface 26. The coating system 102 has a first layer (an under-layer or inner layer) 104 atop the substrate and a second layer 106 (top layer or upper layer or outer layer) atop the first layer. One group of these embodiments involves a bi-layer coating system where the under-layer 104 is of conventional Al-ceramic coating (e.g., of the '169 patent) and is deposited on the substrate followed by the aforementioned active layer material for the outer layer 106. The first layer composition may have similar aluminum and ceramic contents to those given above with lesser, if any, In (likely at most 50% or at most 10% the In of the second layer). Exemplary first layer thickness $T_1$ is 10 micrometers to 40 micrometers, more particularly 20 micrometers to 38 micrometers. Exemplary second layer thickness $T_2$ is 10 micrometers to 40 micrometers, more particularly 20 micrometers to 38 micrometers.

Embodiments of the bi-layer coating 102 may provide advantageous protection to the substrate in both highly active chloride environments (where the less active under-layer 104 is activated due to lower ohmic resistance) and in a more passive sulfuric acid environment (where the top layer 106 becomes active). Thus, various embodiments of the bi-layer coating 102 will enhance the robustness of the coating in a range of coastal and industrial environments relative to a baseline coating of the '169 patent.

The bi-layer (or more) coating 102 with different Al pigments allows one individual layer to be more active than another in a given environment to address operation in multiple environments. In one group of embodiments, the under-layer 104 is favored due to less ohmic drop when the galvanic cell is activated and contains a less active Al pigment; whereas the top layer 106 comprises a more active Al alloy pigment (e.g., Al—Zn—In, Al—In alloys) or a mixture of Al alloy and an activator.

After curing, the coating needs to possess connectivity for both the pigments and pores. The electrical connectivity and porosity will enable electrochemical oxygen reduction coupled with aluminum dissolution to make possible the galvanic protection of the substrate. Thus, further embodiments may have a graded porosity in the bi-layer coating. For example, the top layer 106 may have higher porosity to alloy oxygen transport even when there may be deposits from air pollutants that tend to block the gas passages. The under layer 104 may have lower porosity in order to maintain sufficient throwing power of the localized galvanic couple for protection whereas the top layer 106 supports mass transport when surface contaminants tend to block fine pores during service. Both solid metal content and pores will need to exceed their percolation thresholds, which can vary based on the shape of the solid particles.

In further variations on the foregoing embodiments, stabilizers (e.g., vanadate, molybdate, and/or cerium citrate stabilizers) can be added to the slurry formulation to regulate the spontaneous reactions of Al and Al alloy pigments during storage and coating application. The stabilizer(s) retard reactions of active Al pigment with slurry compounds to ensure shelf lifetime of the mixture and extended time for coating application. Exemplary concentrations of the inhibitors range from 0.0010 M to 0.20 M, more narrowly 0.050 M to 0.20 M, in the combined/final pre-application slurry.

In addition, to the aforementioned high strength, low alloy steel shaft, other materials and articles may benefit from the coating. High strength steels such as UNS K92580/AMS 6532 (ultra-high strength martensitic steel) with higher Ni contents can also particularly benefit from the coating for operation at elevated temperatures. Exemplary components based on those alloys in aero engines include: high pressure compressor rotor hub; low pressure compressor rotor drum; turbine shaft coupling; high pressure turbine hub sleeve and bearing seal front seat. Auxiliary power units (APU) components such as ring gears for aircraft also utilize the high strength steels that need to be protected. The coating is suitable for corrosion protection of those parts that are prone to corrosion but with less concerns of wear resistance.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration and/or composition, details of such baseline may influence details of particular implementations. Accordingly, other embodiments are within the scope of the following claims.

What is claimed is:
1. A method for forming a coating layer on a steel substrate to form a coated steel substrate, the coated steel substrate being a turbomachine shaft and comprising:
 a steel substrate having a surface;
 a coating layer atop the surface; and an under-layer between the surface and the coating layer, wherein:
the coating layer comprises:
aluminum activated by indium; and
a ceramic binder; and
the under-layer comprises:
ceramic binder and aluminum alloy in a naturally passivated state relative to the aluminum activated by indium of the coating layer,
the method for forming the coating layer comprising:
applying one or more slurries, wherein the one or more slurries comprise:
(a) the aluminum of said aluminum activated by indium; and
(b) one or more precursors of the ceramic binder of the coating layer; and
heating to vaporize a carrier of the one or more slurries and thereby form the coating layer including forming the ceramic binder as a ceramic binding network.

2. The method of claim 1 wherein:
the coating layer comprises 5% to 40% porosity.

3. The method of claim 1 wherein the coating layer comprises, by weight:
0.5% to 40% ceramic binder including up to 2% impurities and additives; and
60% to 97.5% aluminum alloy.

4. The method of claim 3 wherein:
the aluminum alloy is at least 90% aluminum by weight.

5. The method of claim 3 wherein:
the aluminum alloy is 0.01% to 3.0% indium by weight.

6. The method of claim 1 wherein the coating layer comprises:
zinc.

7. The method of claim 1 wherein:
the ceramic binder comprises an alkali metal silicate.

8. The method of claim 1 wherein:
the aluminum activated by indium comprises an Al—In alloy.

9. The method of claim 1 wherein the aluminum activated by indium comprises:
aluminum or an aluminum alloy; and
indium oxide.

10. The method of claim 1 wherein:
the under-layer has a lower indium content than the coating layer; and
the under-layer and the coating layer are each at least 20 micrometers thick.

11. The method of claim 1 wherein:
the under-layer has porosity of 7% to 25%;
the coating layer has porosity of 15% to 38%; and
the coating layer is more porous than the under-layer.

12. The method of claim 1 wherein:
the aluminum of said aluminum activated by indium is applied as said aluminum activated by indium as at least one of an Al—In or an Al—Zn—In.

13. The method of claim 1 wherein:
the one or more precursors comprise silica and one or both of $Na_2O$ and $K_2O$;
the silica is initially in a first slurry separate from a second slurry of the one or both of $Na_2O$ and $K_2O$;
the first slurry is mixed with the second slurry prior to the applying.

14. The method of claim 1 wherein:
the one or more slurries comprise indium oxide and activate the aluminum of the one or more slurries to form the aluminum activated by indium.

15. A method for manufacturing a coated steel substrate, the coated steel substrate being a turbomachine shaft and the method comprising:
applying, to the steel substrate, aluminum and one or more precursors of a ceramic binder in one or more slurries; and
heating to vaporize a carrier of the one or more slurries to form a coating and leave the coating comprising:
an outer layer comprising aluminum activated by indium and the ceramic binder; and
an under-layer between the outer layer and the substrate, the underlayer comprising the ceramic binder and aluminum alloy in a naturally passivated state relative to the aluminum activated by indium of the outer layer.

16. The method of claim 15 wherein:
the aluminum is as at least one of an Al—In or an Al—Zn—In.

17. The method of claim 15 wherein:
the one or more precursors comprise glass formers comprising one or more of $Na_2O$, $K_2O$, and silica.

18. The method of claim 15 wherein:
the one or more slurries comprise indium oxide.

19. The method of claim 15 wherein:
the aluminum is as Al—In.

* * * * *